United States Patent
Pyun et al.

(10) Patent No.: US 10,593,288 B2
(45) Date of Patent: Mar. 17, 2020

(54) APPARATUS OF TRANSMITTING AND RECEIVING SIGNAL, SOURCE DRIVER OF RECEIVING STATUS INFORMATION SIGNAL, AND DISPLAY DEVICE HAVING THE SOURCE DRIVER

(71) Applicant: Samsung Display Co., Ltd., Yongin-Si, Gyeonggi-Do (KR)

(72) Inventors: Kihyun Pyun, Gwangmyeong-si (KR); Sung-jun Kim, Hwaseong-si (KR); Yunmi Kim, Changwon-si (KR); Juhyun Kim, Hwaseong-si (KR); Minyoung Park, Busan Si (KR)

(73) Assignee: Samsung Display Co., Ltd. (KR)

( * ) Notice: Subject to any disclaimer, the term of this patent is extended or adjusted under 35 U.S.C. 154(b) by 84 days.

(21) Appl. No.: 16/016,437

(22) Filed: Jun. 22, 2018

(65) Prior Publication Data
US 2019/0147830 A1 May 16, 2019

(30) Foreign Application Priority Data
Nov. 15, 2017 (KR) .................. 10-2017-0152595

(51) Int. Cl.
G09G 5/00 (2006.01)
H04L 7/033 (2006.01)
G09G 3/20 (2006.01)

(52) U.S. Cl.
CPC ........... *G09G 5/008* (2013.01); *G09G 3/2096* (2013.01); *H04L 7/0331* (2013.01); *G09G 2310/066* (2013.01); *G09G 2310/08* (2013.01); *G09G 2370/08* (2013.01); *G09G 2370/12* (2013.01)

(58) Field of Classification Search
CPC .. G09G 5/008; G09G 3/2096; G09G 2370/12; G09G 2310/08; G09G 2370/08; G09G 2310/06; H04L 7/0331
See application file for complete search history.

(56) References Cited

U.S. PATENT DOCUMENTS

| | | | | |
|---|---|---|---|---|
| 5,774,707 A | * | 6/1998 | Bae ....................... | G06F 9/3869 713/600 |
| 2003/0016056 A1 | * | 1/2003 | Matsuzaki ............. | H03M 5/02 326/86 |

(Continued)

FOREIGN PATENT DOCUMENTS

| KR | 10-0328849 B1 | 11/2002 |
|---|---|---|
| KR | 10-2017-0122357 A | 11/2017 |

*Primary Examiner* — Rodney Amadiz
(74) *Attorney, Agent, or Firm* — Innovation Counsel LLP

(57) ABSTRACT

A source driver of a display apparatus includes a receiving controller receiving a first status information signal and outputting a second status information signal and a receiving circuit receiving a transmission signal in response to the second status information signal and recovering the transmission signal to receiving data. The receiving controller includes a transition detection circuit detecting a transition of the first status information signal and outputting a transition detection signal, a delay circuit delaying the transition detection signal by a predetermined time and outputting a delay detection signal, and an output circuit receiving the first status information signal and outputting the second status information signal in response to the delay detection signal.

20 Claims, 8 Drawing Sheets

(56) References Cited

U.S. PATENT DOCUMENTS

| | | | |
|---|---|---|---|
| 2005/0035798 A1* | 2/2005 | Best | H03L 7/095 327/157 |
| 2011/0037758 A1* | 2/2011 | Lim | H03L 7/0805 345/213 |
| 2017/0032125 A1 | 2/2017 | Lee et al. | |
| 2017/0141764 A9 | 5/2017 | Sehgal et al. | |
| 2017/0309220 A1 | 10/2017 | Kim et al. | |

* cited by examiner

APPARATUS OF TRANSMITTING AND RECEIVING SIGNAL, SOURCE DRIVER OF RECEIVING STATUS INFORMATION SIGNAL, AND DISPLAY DEVICE HAVING THE SOURCE DRIVER

CROSS-REFERENCE TO RELATED APPLICATION

This U.S. non-provisional patent application claims priority under 35 U.S.C. § 119 of Korean Patent Application No. 10-2017-0152595, filed on Nov. 15, 2017, the disclosure of which is hereby incorporated by reference in its entirety.

BACKGROUND

1. Field of Disclosure

The present disclosure relates to an apparatus of transmitting and receiving a signal, a source driver of receiving a status information signal, and a display device having the source driver.

2. Description of the Related Art

In general, a display device includes a display panel displaying an image, a timing controller, a data driver, and a gate driver. The timing controller, the data driver, and the gate driver provide driving signals to the display panel. The display panel includes gate lines, data lines, and pixels. The data driver applies data signals to the data lines, and the gate driver applies gate signals to the gate lines to drive the gate lines. The timing controller controls the data driver and the gate driver.

The gate driver applies the gate signals having a gate-on voltage level to some gate lines, and the data driver applies the data signals corresponding to image signals to the data lines to display the image on the display panel of the display device.

SUMMARY

The present disclosure provides an apparatus including a receiver capable of removing a glitch from a signal received through a transmission channel.

The present disclosure provides a source driver capable of removing a glitch from a status information signal.

The present disclosure provides a display device having the source driver.

Embodiments of the inventive concept provide an apparatus including a transmitter converting transmission data to a transmission signal and transmitting the transmission signal and a first status information signal to a transmission channel and a receiver receiving the transmission signal and the first status information signal. The receiver includes a transition detection circuit detecting a transition of the first status information signal received through the transmission channel and outputting a transition detection signal, a delay circuit delaying the transition detection signal by a predetermined time and outputting a delay detection signal, an output circuit receiving the first status information signal and outputting a second status information signal in response to the delay detection signal, and a receiving circuit receiving the transmission signal through the transmission channel and outputting receiving data in response to the second status information signal.

The transmission data may include image data signals.

The transition detection circuit may include a first delay circuit receiving the first status information signal and outputting a first signal in synchronization with a clock signal, a second delay circuit receiving the first signal from the first delay circuit and outputting a second signal in synchronization with the clock signal, and a logic circuit receiving the first signal and the second signal and outputting the transition detection signal.

The logic circuit may output the transition detection signal having a first level when the first and second signals have different signal levels from each other.

Each of the first delay circuit and the second delay circuit may include a flip-flop.

The output circuit may output the first status information signal as the second status information signal when the delay detection signal is transited to a first level from a second level different than the first level.

The output circuit may include a flip-flop including an input terminal receiving the first status information signal, a clock input terminal receiving the delay detection signal, and an output terminal outputting the second status information signal.

Embodiments of the inventive concept provide a source driver including a receiving controller receiving a first status information signal and outputting a second status information signal and a receiving circuit receiving a transmission signal in response to the second status information signal and recovering the transmission signal to receiving data. The receiving controller includes a transition detection circuit detecting a transition of the first status information signal and outputting a transition detection signal, a delay circuit delaying the transition detection signal by a predetermined time and outputting a delay detection signal, and an output circuit receiving the first status information signal and outputting the second status information signal in response to the delay detection signal.

The receiving data may include a receiving data signal and a main clock signal.

The source driver may further include a data recovery circuit recovering the receiving data signal among the receiving data, a clock recovery circuit recovering the main clock signal among the receiving data, and a data output circuit outputting the receiving data signal as data driving signals that are applied to a plurality of data lines in response to the main clock signal.

The transition detection circuit may include a first delay circuit receiving the first status information signal and outputting a first signal in synchronization with a clock signal, a second delay circuit receiving the first signal from the first delay circuit and outputting a second signal in synchronization with the clock signal, and a logic circuit receiving the first signal and the second signal and outputting the transition detection signal.

The logic circuit may output the transition detection signal having a first level when the first and second signals have different signal levels from each other.

The output circuit may output the first status information signal as the second status information signal when the delay detection signal is transited to a first level from a second level different than the first level.

The output circuit may include a flip-flop including an input terminal receiving the first status information signal, a clock input terminal receiving the delay detection signal, and an output terminal outputting the second status information signal.

Embodiments of the inventive concept provide a display apparatus including a display panel including a plurality of gate lines, a plurality of data lines, and a plurality of pixels each being connected to a corresponding gate line among the gate lines and a corresponding data line among the data lines, a gate driver driving the gate lines, a source driver driving the data lines, and a timing controller controlling the gate driver and the source driver in response to a control signal and an image input signal, converting the image input signal to a transmission signal, and transmitting the transmission signal and a first status information signal to the source driver. The source driver includes a receiving controller receiving a first status information signal and outputting a second status information signal and a receiving circuit receiving the transmission signal in response to the second status information signal and recovering the transmission signal to receiving data. The receiving controller includes a transition detection circuit detecting a transition of the first status information signal and outputting a transition detection signal, a delay circuit delaying the transition detection signal by a predetermined time and outputting a delay detection signal, and an output circuit outputting the first status information signal as the second status information signal in response to the delay detection signal.

The receiving data may include a receiving data signal and a main clock signal.

The source driver may further include a data recovery circuit recovering the receiving data signal among the receiving data, a clock recovery circuit recovering the main clock signal among the receiving data, and a data output circuit outputting the receiving data signal as data driving signals that are applied to the data lines in response to the main clock signal.

The transition detection circuit may include a first delay circuit receiving the first status information signal and outputting a first signal in synchronization with a clock signal, a second delay circuit receiving the first signal from the first delay circuit and outputting a second signal in synchronization with the clock signal, and a logic circuit receiving the first signal and the second signal and outputting the transition detection signal.

The logic circuit may output the transition detection signal having a first level when the first and second signals have different signal levels from each other.

The output circuit may include a flip-flop comprising an input terminal receiving the first status information signal, a clock input terminal receiving the delay detection signal, and an output terminal outputting the second status information signal.

According to the above, the receiver may remove a glitch in the received signal. The source driver may remove the glitch in the status information signal received from the outside, and thus the apparatus may be prevented from malfunctioning.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
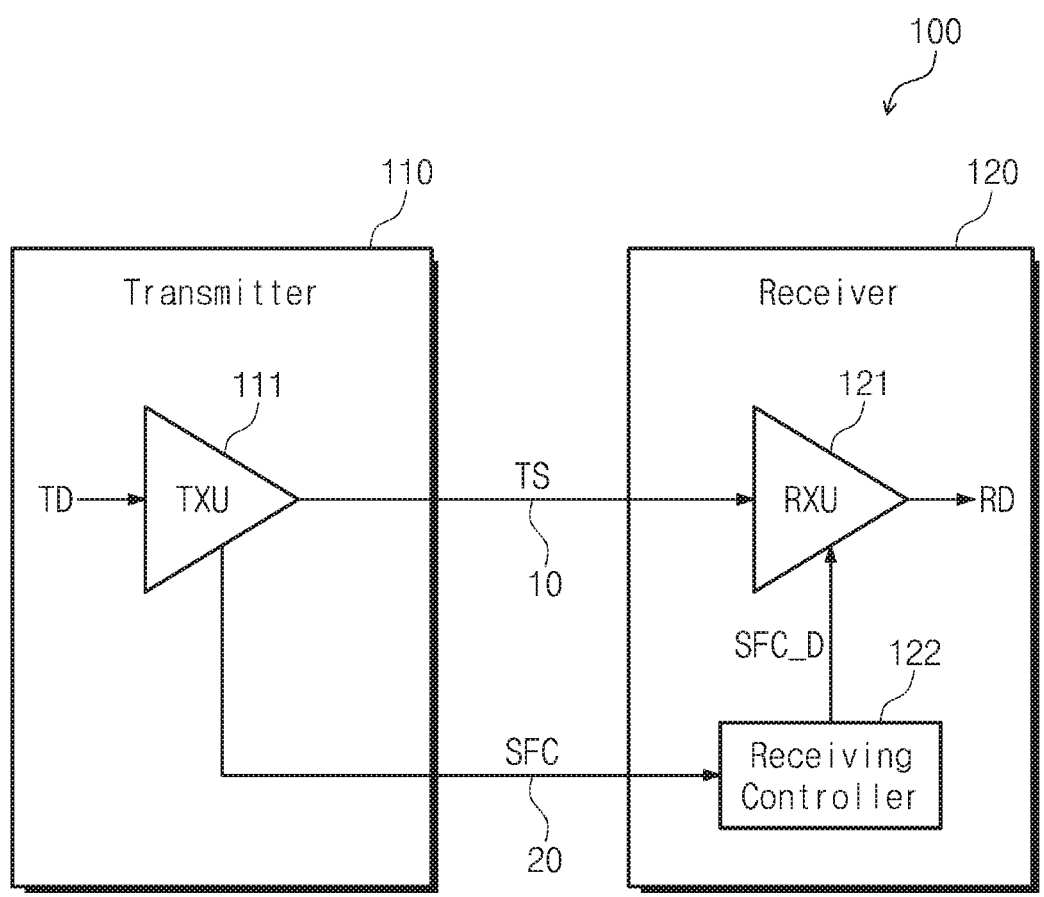
FIG. 1 is a block diagram showing a transmitting and receiving apparatus according to an exemplary embodiment of the present disclosure.

Hereinafter, exemplary embodiments of the present disclosure will be described in detail with reference to the accompanying drawings. In the drawings, the same reference numbers will be used throughout the present disclosure to designate the same or equivalent elements. However, the present disclosure may be variously modified and realized in many different forms, and thus the present disclosure should not be construed as limited to the illustrated embodiments. Rather, these embodiments are provided as examples so that the present disclosure will be thorough and complete and will fully convey the aspects and features to those skilled in the art. For the complete understanding of the aspects and features of the present disclosure, unnecessary processes, elements, and techniques for those skilled in the art may be omitted. Unless noted otherwise, like reference numerals refers to like elements throughout the accompanying drawings and the technical description, and therefore description thereof will not be repeated.

Unless otherwise defined, all terms (including technical and scientific terms) used herein have the same meaning as commonly understood by one of ordinary skill in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram showing a transmitting and receiving apparatus 100 according to an exemplary embodiment of the present disclosure.

Referring FIG. 1, the transmitting and receiving apparatus 100 includes a transmitter 110, a receiver 120, and transmission channels 10 and 20. The transmitting and receiving apparatus 100 may be applied to various electronic systems, such as a display device, an audio device, a home network, a broadcast network, a wired/wireless communication system, etc.

The transmission channels 10 and 20 include a data transmission channel 10 and a status transmission channel 20. The data transmission channel 10 may be referred to as a "main link", and the status transmission channel 20 may be referred to as an "auxiliary link".

The transmitter 110 converts transmission data TD to a transmission signal TS based on an interface between the transmitter 110 and the receiver 120 of the transmitting and receiving apparatus 100 and transmits the transmission signal TS to the receiver 120 through the data transmission channel 10. For example, in a case where the transmitting and receiving apparatus 100 is included in a display device, the transmission signal TS may be image data signals. The transmitter 110 includes a transmission circuit 111 that converts the transmission data TD to the transmission signals TS by taking into account the interface and characteristics of the data transmission channel 10 and provides the transmission signal TS to the receiver 120 through the data transmission channel 10.

According to another embodiment, the transmission circuit 111 may convert the transmission data TD to the transmission signal TS that is a serial signal depending on the interface. The transmission data TD may be a signal into which a clock signal is embedded. According to another embodiment, the transmission circuit 111 may convert the transmission data TD to the transmission signal TS after embedding the clock signal into the transmission data TD. According to another embodiment, in a case where the data transmission channel 10 includes two signal lines, the transmission circuit 111 may convert the transmission data TD to the transmission signal TS having a differential signal pair. The transmission circuit 111 may further apply a first status information signal SFC to the receiver 120 through the status transmission channel 20.

In the present exemplary embodiment, the interface between the transmitter 110 and the receiver 120 may be one of a Universal Serial Interface (USI), a CPU interface, an RGB interface, a mobile industry processor interface (MIPI), mobile display digital interface (MDDI), a compact display port (CDP), a mobile pixel link (MPL), a current mode advanced differential signaling (CMADS), a serial peripheral interface (SPI), an inter-Integrated Circuit (I$^2$C) interface, a display port (DP), an embedded display port (eDP) interface, a camera control interface (CCI), a camera serial interface (CSI), a microcontroller unit (MCU) interface, and a high definition multimedia interface (HDMI). In addition, the interface may be one of various high-speed serial interfaces.

The receiver 120 receives the transmission signal TS transmitted from the transmitter 110. The receiver 120 includes a receiving circuit 121 and a receiving controller 122. The receiving circuit 121 receives the transmission signal TS through the data transmission channel 10 and recovers receiving data RD from the transmission signal TS. The receiving data RD may include only data or include the data and an embedded clock signal.

The receiving controller 122 controls the receiving circuit 121 to improve a signal receiving efficiency. For example, the receiving controller 122 controls an initialization of the receiving circuit 121. In the present exemplary embodiment, the receiving controller 122 receives the first status information signal SFC through the status transmission channel 20 and outputs a second status information signal SFC_D by removing a glitch from the first status information signal SFC. The receiving circuit 121 recovers the transmission signal TS to the receiving data RD in response to the second status information signal SFC_D. The second status information signal SFC_D may be a signal by delaying the first status information signal SFC by a predetermined time.

Figure 2:
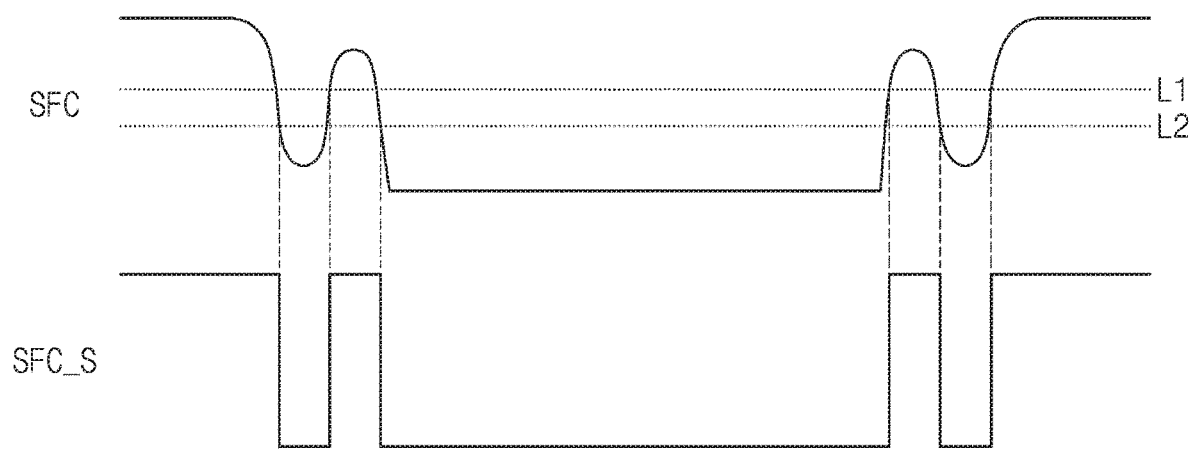
FIG. 2 is a timing diagram showing a first status information signal received in a receiver through a transmission channel.

FIG. 2 is a timing diagram showing the first status information signal SFC received in the receiver 120 through the transmission channel 20.

Referring to FIGS. 1 and 2, the first status information signal SFC received in the receiving controller 122 swings between a first level (e.g., a high level) and a second level (e.g., a low level). When the first status information signal SFC is transited to the second level from the first level or to the first level from the second level, a glitch component may be included in the first status information signal SFC.

When a voltage level of the first status information signal SFC received in the receiving controller 122 is higher than a first reference level L1, the receiving controller 122 outputs a sensing status information signal SFC_S having a first sensing level (e.g., the high level). When the voltage level of the first status information signal SFC received in the receiving controller 122 is lower than a second reference level L2, the receiving controller 122 outputs a sensing status information signal SFC_S having a second sensing level (e.g., the low level).

As an example, when the first and second levels of the first status information signal SFC are about 3.3 volts and about 0 volts, respectively, the first reference level L1 is about 1.98 (3.3 volts×0.6) volts, and the second reference level L2 is about 1.32 (3.3 volts×0.4) volts.

As shown in FIG. 2, in a case where a variation of the glitch component in the first status information signal SFC received through the status transmission channel 20 is large, the sensing status information signal SFC_S may have a waveform that is different from that of the first status information signal SFC transmitted from the transmitter 110.

Figure 3:
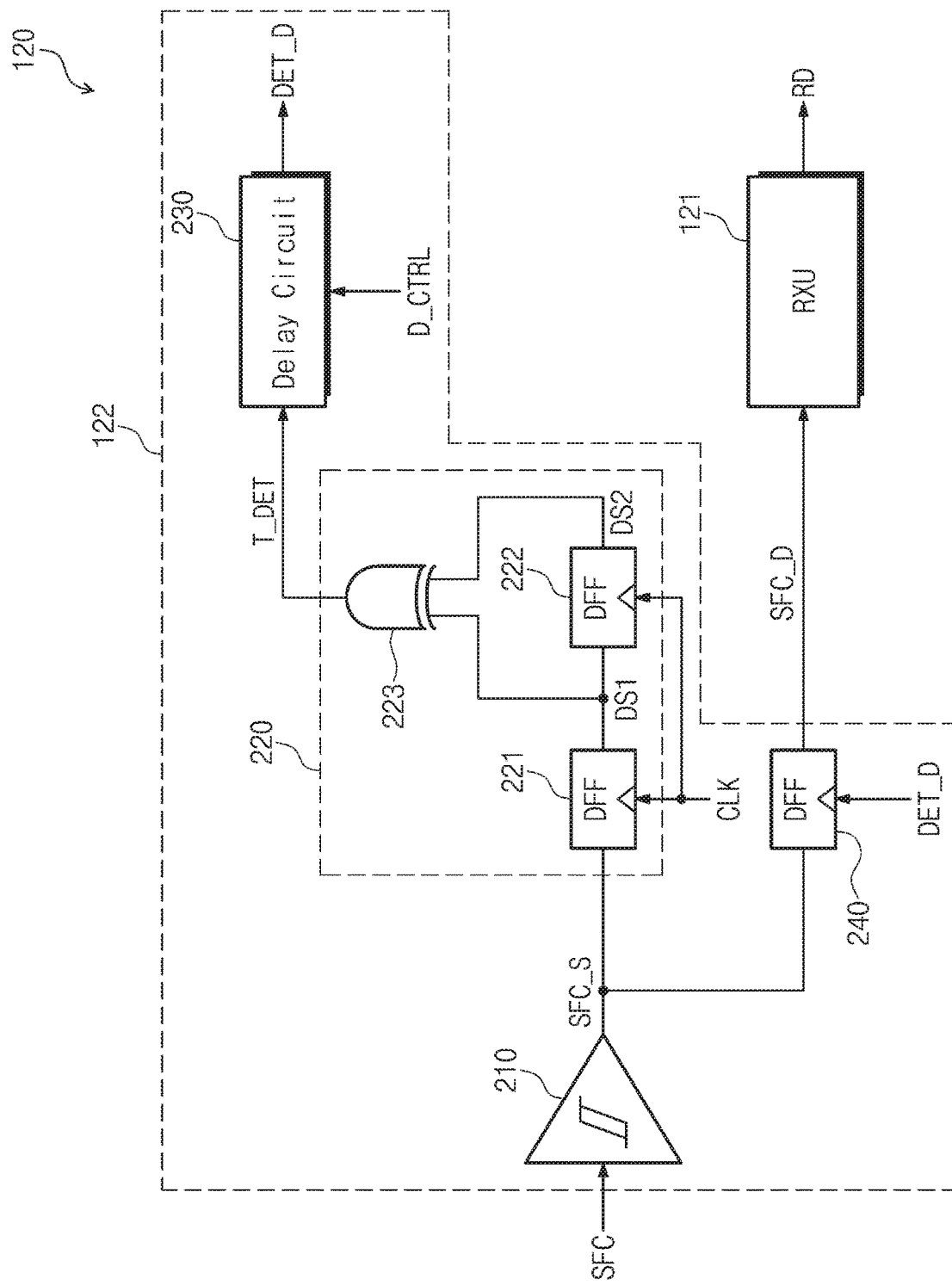
FIG. 3 is a block diagram showing a configuration of a receiver according to an exemplary embodiment of the present disclosure.

FIG. 3 is a block diagram showing a configuration of the receiver 120 according to an exemplary embodiment of the present disclosure.

Referring to FIG. 3, the receiving controller 122 includes a Schmitt trigger circuit 210, a transition detection circuit 220, a delay circuit 230, and an output circuit 240.

The Schmitt trigger circuit 210 receives the first status information signal SFC through the status transmission channel 20 shown in FIG. 1. The Schmitt trigger circuit 210 senses a variation in the voltage of the first status information signal SFC and outputs the sensing status information signal SFC_S transited between the first sensing level and the second sensing level. As an example, the first status information signal SFC input to the Schmitt trigger circuit 210 and the sensing status information signal SFC_S output from the Schmitt trigger circuit 210 may have the same waveform as the waveform shown in FIG. 2.

The transition detection circuit 220 detects a transition of the sensing status information signal SFC_S output from the Schmitt trigger circuit 210 and outputs a transition detection signal T_DET. The transition detection circuit 220 includes a first delay circuit 221, a second delay circuit 222, and a logic circuit 223.

Each of the first and second delay circuits 221 and 222 may be a D flip-flop. The first delay circuit 221 outputs the sensing status information signal SFC_S as a first delay signal DS1 in synchronization with a clock signal CLK. The second delay circuit 222 receives the first delay signal DS1 and outputs a second delay signal DS2 in synchronization with the clock signal CLK. Although not shown in figures, the clock signal CLK may be generated by a reference clock generator included in the receiver 120. According to another embodiment, the clock signal CLK may be externally provided from the outside of the receiver 120.

The logic circuit 223 receives the first delay signal DS1 from the first delay circuit 221 and the second delay signal DS2 from the second delay circuit 222 and outputs the transition detection signal T_DET. The logic circuit 223 may be an exclusive-OR (XOR) gate. As an example, when the first delay signal DS1 and the second delay signal DS2 have different signal levels from each other, the logic circuit 223 outputs the transition detection signal T_DET having the first level (e.g., the high level). When the first delay signal DS1 and the second delay signal DS2 have the same signal levels as each other, the logic circuit 223 outputs the transition detection signal T_DET having the second level (e.g., the low level).

The delay circuit 230 outputs a delay detection signal DET_D by delaying the transition detection signal T_DET by a predetermined time. As an example, the delay circuit 230 includes a plurality of inverters connected to each other in series. According to another embodiment, the delay circuit 230 includes a plurality of flip-flops connected to each other in series. The delay circuit 230 controls the delay time of the delay detection signal DET_D in response to a delay control signal D_CTRL.

The output circuit 240 receives the sensing status information signal SFC_S and outputs the second status information signal SFC_D in synchronization with the delay detection signal DET_D received from the delay circuit 230. For example, output circuit 240 includes a flip-flop having an input terminal receiving the sensing status information signal SFC_S, a clock input terminal receiving the delay detection signal DET_D, and an output terminal outputting the second status information signal SFC_D. The output circuit 240 may include a D flip-flop. In a case where the delay detection signal DET_D is transited to the first level from the second level, and the sensing status information signal SFC_S has the first level, the output circuit 240 may output the second status information signal SFC_D having the first level. In a case where the delay detection signal DET_D is transited to the first level from the second level and the sensing status information signal SFC_S has the second level, the output circuit 240 may output the second status information signal SFC_D having the second level. The receiving circuit 121 recovers the transmission signal TS to the receiving data RD in response to the second status information signal SFC_D.

Figure 4:
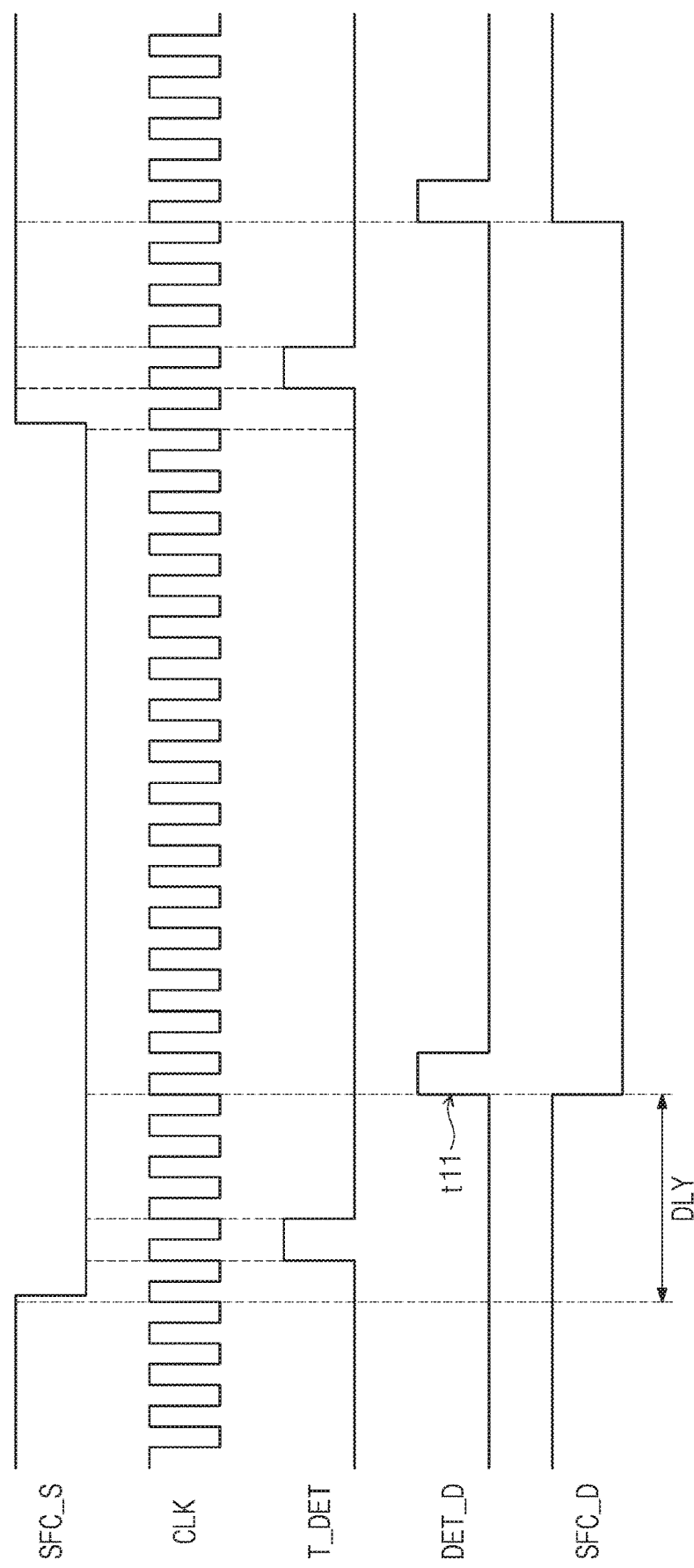
FIG. 4 is a timing diagram showing an example in which a glitch is not included in a first status information signal received in a receiver through a status transmission channel.

FIG. 4 is a timing diagram showing an example in which a glitch is not included in the first status information signal SFC received in the receiver 120 through a status transmission channel.

Referring to FIGS. 3 and 4, the transition detection circuit 220 outputs the transition detection signal T_DET having the first level when the first delay signal DS1 from the first delay circuit 221 and the second delay signal DS2 from the second delay circuit 222 have different signal levels from each other. That is, the transition detection circuit 220 outputs the transition detection signal T_DET having the first level when the sensing status information signal SFC_S is transited to the low level from the high level or to the high level from the low level.

The transition detection circuit 220 detects the transition of the sensing state information signal SFC_S that is output from the Schmitt trigger circuit 210 and outputs the transition detection signal T_DET. The delay circuit 230 outputs the delay detection signal DET_D by delaying the transition detection signal T_DET by a predetermined time. In the case where the delay detection signal DET_D is transited to the first level (i.e., the high level) from the second level (i.e., the low level) (t11) and the sensing status information signal SFC_S has the second level (i.e., the low level), the output circuit 240 outputs the second status information signal SFC_D having the second level (i.e., the low level). In the exemplary embodiment shown in FIG. 4, the second status information signal SFC_D is a signal by delaying the sensing status information signal SFC_S by a predetermined time DLY.

Figure 5:
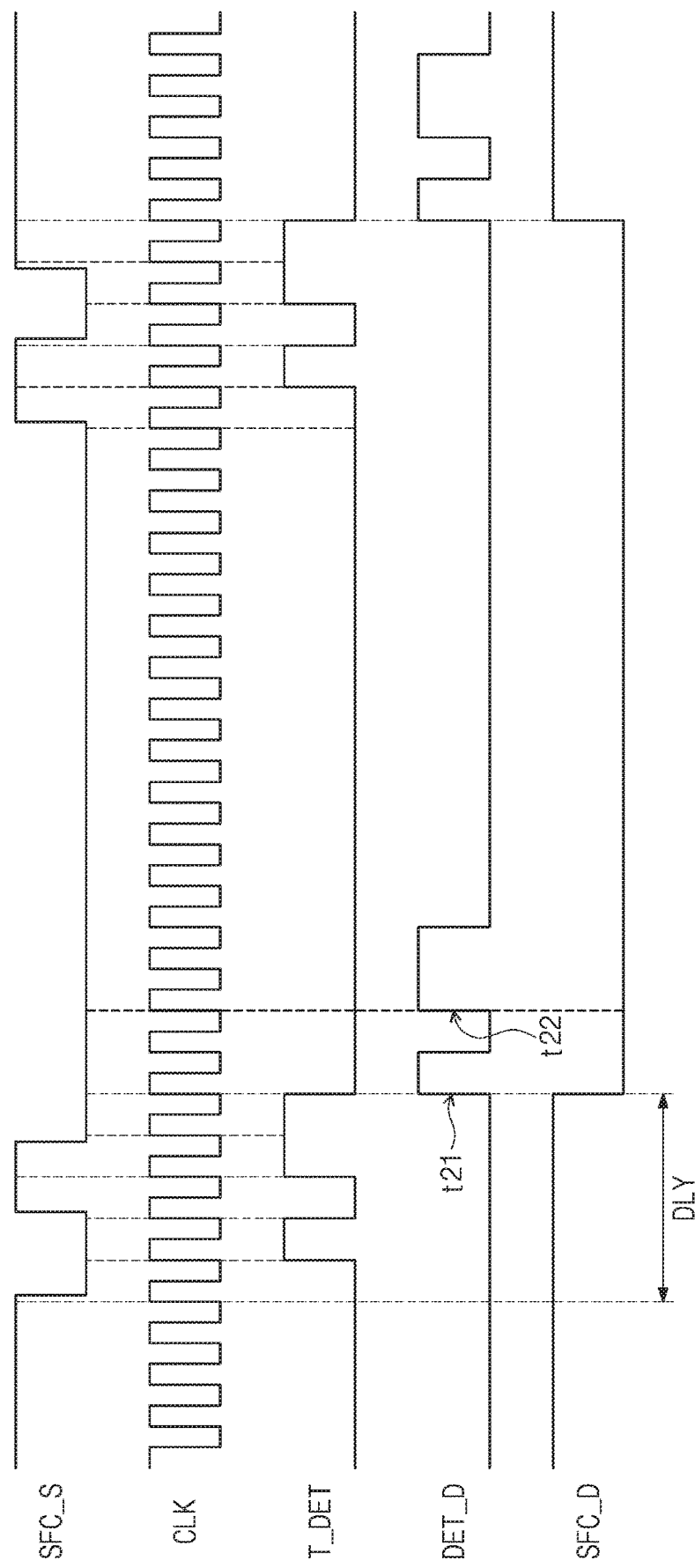
FIG. 5 is a timing diagram showing an example in which a glitch is included in a first status information signal received in a receiver through a status transmission channel.

FIG. 5 is a timing diagram showing an example in which a glitch is included in a first status information signal received in a receiver through a status transmission channel.

Referring to FIGS. 3 and 5, the transition detection signal T_DET output from the transition detection circuit 220 and the delay detection signal DET_D are changed depending on a state transition of the sensing status information signal SFC_S.

Since the sensing status information signal SFC_S has the second level (i.e., the low level) at a first point t21 at which the delay detection signal DET_D is transited to the first level (i.e., the high level) from the second level (i.e., the low level), the output circuit 240 outputs the second status information signal SFC_D having the second level (i.e., the low level). Since the sensing status information signal SFC_S has the second level (i.e., the low level) at a second point t22 at which the delay detection signal DET_D is transited to the first level (i.e., the high level) from the second level (i.e., the low level), the second status information signal SFC_D that is output from the output circuit 240 maintains the second level (i.e., the low level).

In the exemplary embodiment shown in FIG. 5, the glitch component may be included in the sensing status information signal SFC_S when the sensing status information signal SFC_S is transited to the first level from the second level or to the second level from the first level. The receiving controller 122 may output the second status information signal SFC_D by delaying the sensing status information signal SFC_S by the predetermined time DLY and removing the glitch component included in the sensing status information signal SFC_S.

Figure 6:
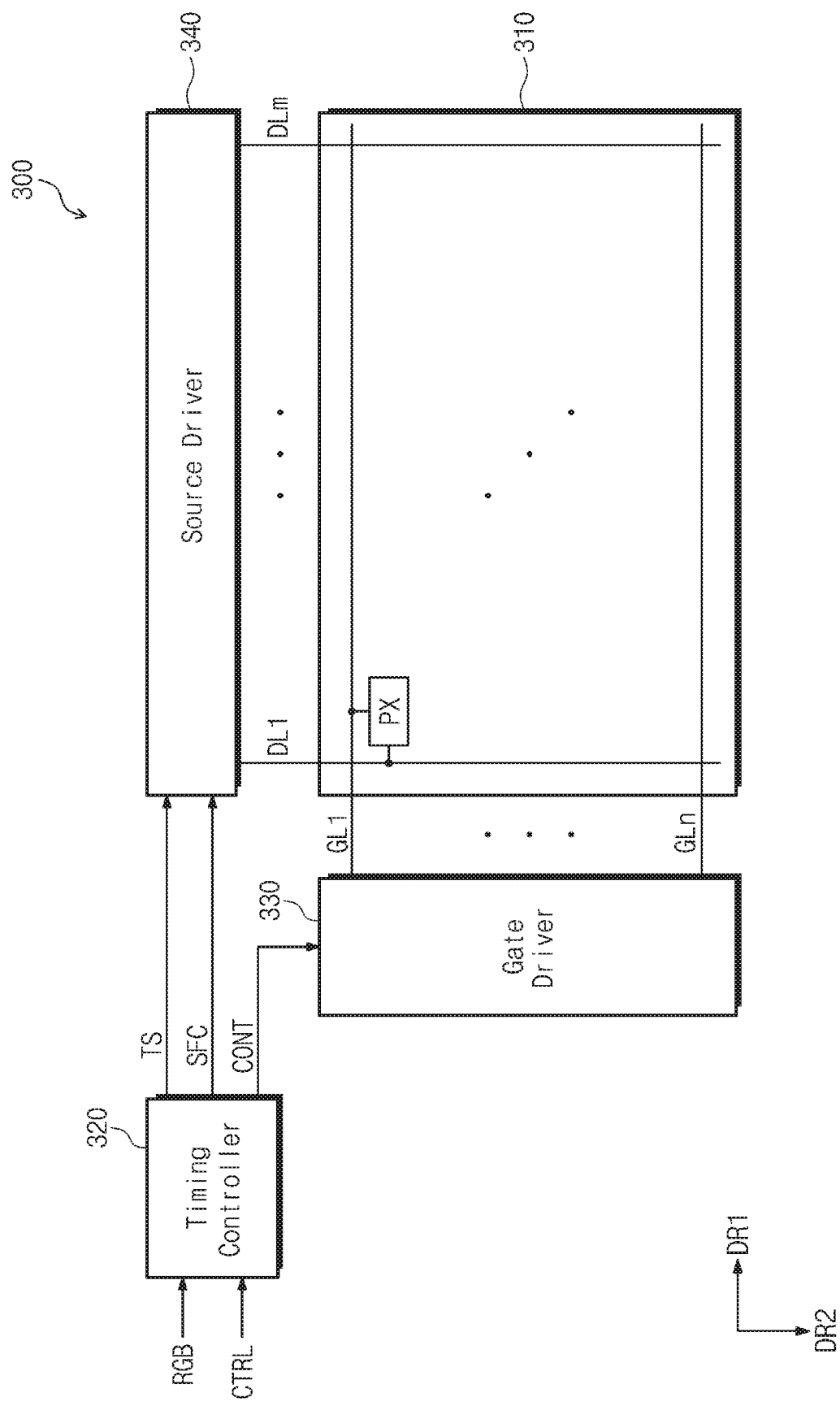
FIG. 6 is a block diagram showing a configuration of a display device according to an exemplary embodiment of the present disclosure.

FIG. 6 is a block diagram showing a configuration of a display device 300 according to an exemplary embodiment of the present disclosure.

Referring to FIG. 6, the display device 300 includes a display panel 310, a timing controller 320, a gate driver 330, and a source driver 340.

The display panel 110 includes a plurality of gate lines GL1 to GLn extending in a first direction DR1, a plurality of data lines DL1 to DLm extending in a second direction DR2, and a plurality of pixels PX respectively arranged in cross areas defined by the gate lines GL1 to GLn and the data lines DL1 to DLm crossing the gate lines GL1 to GLn. The data lines DL1 to DLm are insulated from the gate lines GL1 to GLn.

The timing controller 320 receives image signals RGB and control signals CTRL from an external source (not shown). The control signals CTRL includes, for example, a vertical synchronization signal, a horizontal synchronization signal, a main clock signal, and data enable signal. The timing controller 320 controls the gate driver 330 and the source driver 340 in response to the control signals CTRL.

The timing controller 320 applies the transmission signal TS and the first status information signal SFC to the source driver 340. The timing controller 320 generates image data signals by processing the image signals RGB based on an operation condition of the display panel 110, and a first control signal. The generated image data signals and the first control signal are applied to the source driver 340 as the transmission signal TS. The timing controller 320 applies a second control signal CONT to the gate driver 330.

The first control signal included in the transmission signal TS includes a clock signal (e.g., clock signal CLK shown in FIG. 3), and the second control signal CONT includes a vertical synchronization start signal, an output enable signal, and a gate pulse signal.

The gate driver 330 drives the gate lines GL1 to GLn in response to the second control signal CONT received from the timing controller 320. The gate driver 330 includes a gate driving IC (integrated circuit). According to another embodiment, the gate driver 330 is implemented by an oxide semiconductor, an amorphous semiconductor, a crystalline semiconductor, or a polycrystalline semiconductor and formed in a predetermined area of the display panel 110. In this case, the gate driver 330 may be substantially simultaneously formed with the pixels PX through a thin film process.

The source driver 340 drives the data lines DL1 to DLm in response to the transmission signal TS and the first status information signal SFC received from the timing controller 320.

Figure 7:
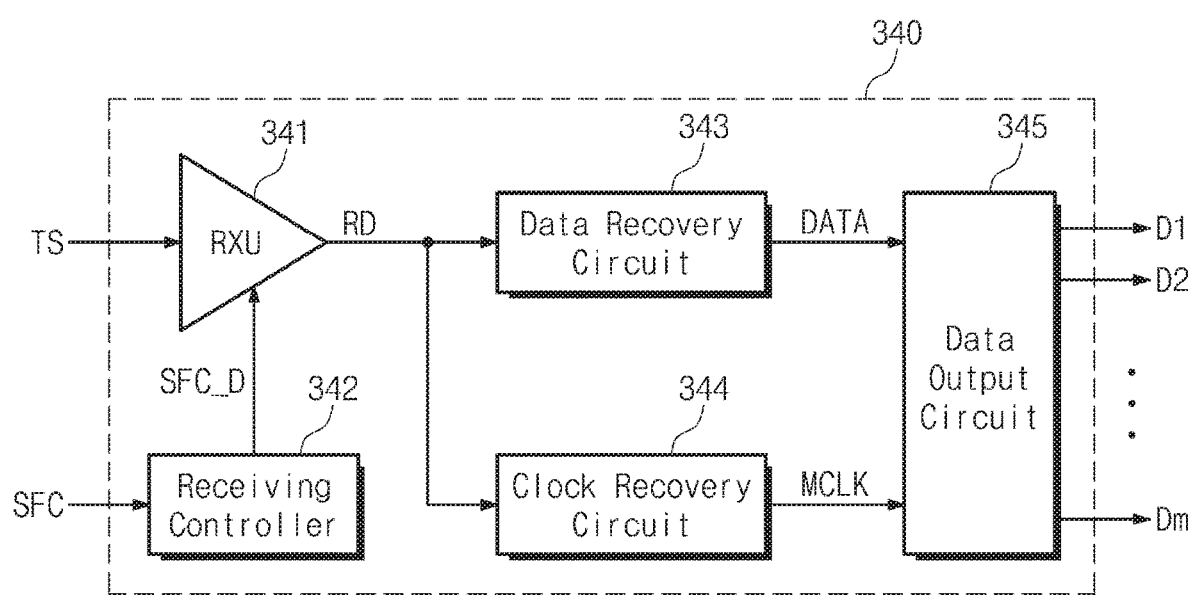
FIG. 7 is a block diagram showing a configuration of a source driver according to an exemplary embodiment of the present disclosure.

FIG. 7 is a block diagram showing a configuration of the source driver 340 according to an exemplary embodiment of the present disclosure.

Referring to FIG. 7, the source driver 340 includes a receiving circuit 341, a receiving controller 342, a data recovery circuit 343, a clock recovery circuit 344, and a data output circuit 345.

Referring to FIG. 7, the receiving controller 342 detects a transition of the first status information signal SFC received from the timing controller 320 shown in FIG. 6 and outputs the second status information signal SFC_D. In the present exemplary embodiment, the receiving controller 342 may output the second status information signal SFC_D by removing a glitch component included in the first status information signal SFC that is received through the status transmission channel 20 shown in FIG. 1. The second status information signal SFC_D may be obtained by delaying the first status information signal SFC by a predetermined time.

The receiving circuit 341 recovers the transmission signal TS and outputs the receiving data RD in response to the second status information signal SFC_D received from the receiving controller 342. The recovered receiving data RD include the image data signals and the clock signal that are recovered to be free of a glitch component caused by signal transiting.

The data recovery circuit 343 outputs the image data signals DATA included in the recovered receiving data RD. The clock recovery circuit 344 outputs a clock signal MCLK included in the recovered receiving data RD. The data output circuit 345 converts the image data signals DATA to the data signals D1 to Dm and applies the data signals D1 to Dm to the data lines DL1 to DLm shown in FIG. 1 in synchronization with the clock signal MCLK.

Figure 8:
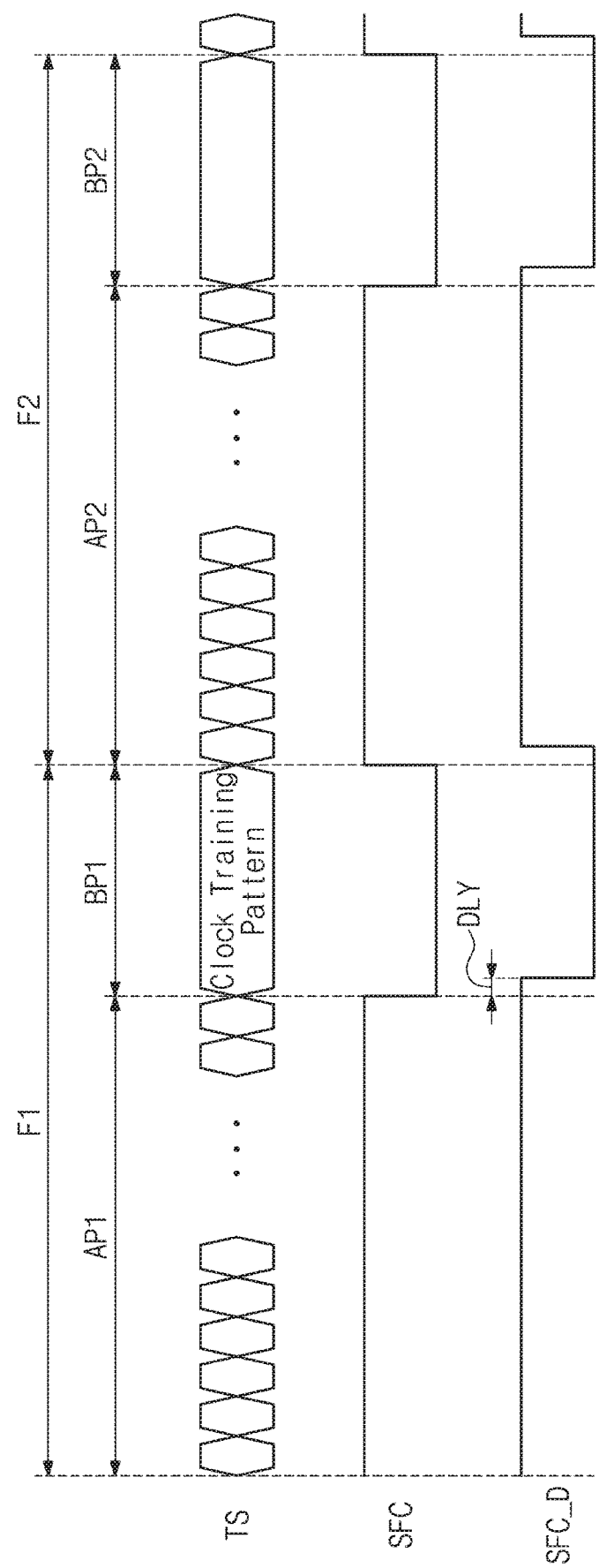
FIG. 8 is a timing diagram showing signals received in a source driver according to an exemplary embodiment of the present disclosure.

FIG. 8 is a timing diagram showing signals received in the source driver 340 according to an exemplary embodiment of the present disclosure.

Referring to FIGS. 7 and 8, a first frame F1 includes an active period AP1 and a blank period BP1, and a second frame F2 includes an active period AP2 and a blank period BP2. The first status information signal SFC is transited to the second level (i.e., the low level) from the first level (i.e., the high level) at a time point, where the active periods AP1 and AP2 of the first and second frames F1 and F2 are ended and the blank periods BP1 and BP2 of the first and second frames F1 and F2 begin, and transited to the first level from the second level at another time point, where the blank periods BP1 and BP2 of the first and second frames F1 and F2 are ended and the active periods AP1 and AP2 of the first and second frames F1 and F2 begin.

The timing controller 320 shown in FIG. 6 may apply a predetermined clock training pattern to the source driver 340 as the transmission signal TS during a period in which the first status information signal SFC is maintained at the low level. The source driver 340 recovers the clock training pattern that is received during the low level of the first status information signal SFC, for example, during the blank period, to the clock signal MCLK to accomplish a frequency lock. An operation for the frequency lock is required to be completed during the period in which the first status information signal SFC is maintained at the low level. In a case where the frequency lock operation is not completed, an unstable image may be displayed through the display panel 310.

As shown in FIG. 2, in the case where the glitch component is included in the first status information signal SFC, the period in which the first status information signal SFC is maintained at the low level may become short.

The receiving controller 342 shown in FIG. 7 may have the same circuit configuration as that of the receiving controller 122 shown in FIG. 3, and thus the receiving controller 342 may output the second status information signal SFC_D by removing the glitch component from the first status information signal SFC.

Although the exemplary embodiments of the present disclosure have been described, it is understood that the present disclosure should not be limited to these exemplary embodiments, but various changes and modifications can be made by one ordinary skilled in the art within the spirit and scope of the present disclosure as hereinafter claimed.

What is claimed is:

1. An apparatus comprising:
a transmitter converting transmission data to a transmission signal and transmitting the transmission signal and a first status information signal to a transmission channel; and
a receiver receiving the transmission signal and the first status information signal, the receiver comprising:
a transition detection circuit detecting a transition of the first status information signal received through the transmission channel and outputting a transition detection signal;
a delay circuit delaying the transition detection signal by a predetermined time and outputting a delay detection signal;
an output circuit receiving the first status information signal and outputting a second status information signal in response to the delay detection signal; and
a receiving circuit receiving the transmission signal through the transmission channel and outputting receiving data in response to the second status information signal.

2. The apparatus of claim 1, wherein the transmission data comprise image data signals.

3. The apparatus of claim 1, wherein the transition detection circuit comprises:
a first delay circuit receiving the first status information signal and outputting a first signal in synchronization with a clock signal;
a second delay circuit receiving the first signal from the first delay circuit and outputting a second signal in synchronization with the clock signal; and
a logic circuit receiving the first signal and the second signal and outputting the transition detection signal.

4. The apparatus of claim 3, wherein the logic circuit outputs the transition detection signal having a first level when the first and second signals have different signal levels from each other.

5. The apparatus of claim 3, wherein each of the first delay circuit and the second delay circuit comprises a flip-flop.

6. The apparatus of claim 1, wherein the output circuit outputs the first status information signal as the second status information signal when the delay detection signal is transited to a first level from a second level different than the first level.

7. The apparatus of claim 6, wherein the output circuit comprises a flip-flop comprising an input terminal receiving the first status information signal, a clock input terminal receiving the delay detection signal, and an output terminal outputting the second status information signal.

8. A source driver comprising:
a receiving controller receiving a first status information signal and outputting a second status information signal; and
a receiving circuit receiving a transmission signal in response to the second status information signal and recovering the transmission signal to receiving data, the receiving controller comprising:
a transition detection circuit detecting a transition of the first status information signal and outputting a transition detection signal;
a delay circuit delaying the transition detection signal by a predetermined time and outputting a delay detection signal; and
an output circuit receiving the first status information signal and outputting the second status information signal in response to the delay detection signal.

9. The source driver of claim 8, wherein the receiving data comprise a receiving data signal and a main clock signal.

10. The source driver of claim 9, further comprising:
a data recovery circuit recovering the receiving data signal among the receiving data;
a clock recovery circuit recovering the main clock signal among the receiving data; and
a data output circuit outputting the receiving data signal as data driving signals that are applied to a plurality of data lines in response to the main clock signal.

11. The source driver of claim 8, wherein the transition detection circuit comprises:
a first delay circuit receiving the first status information signal and outputting a first signal in synchronization with a clock signal;
a second delay circuit receiving the first signal from the first delay circuit and outputting a second signal in synchronization with the clock signal; and
a logic circuit receiving the first signal and the second signal and outputting the transition detection signal.

12. The source driver of claim 11, wherein the logic circuit outputs the transition detection signal having a first level when the first and second signals have different signal levels from each other.

13. The source driver of claim 8, wherein the output circuit outputs the first status information signal as the second status information signal when the delay detection signal is transited to a first level from a second level different than the first level.

14. The source driver of claim 13, wherein the output circuit comprises a flip-flop comprising an input terminal receiving the first status information signal, a clock input terminal receiving the delay detection signal, and an output terminal outputting the second status information signal.

15. A display apparatus comprising:
a display panel comprising a plurality of gate lines, a plurality of data lines, and a plurality of pixels each being connected to a corresponding gate line among the gate lines and a corresponding data line among the data lines;
a gate driver driving the gate lines;
a source driver driving the data lines; and
a timing controller controlling the gate driver and the source driver in response to a control signal and an image input signal, converting the image input signal to a transmission signal, and transmitting the transmission signal and a first status information signal to the source driver, the source driver comprising:
a receiving controller receiving a first status information signal and outputting a second status information signal; and
a receiving circuit receiving the transmission signal in response to the second status information signal and recovering the transmission signal to receiving data, the receiving controller comprising:
a transition detection circuit detecting a transition of the first status information signal and outputting a transition detection signal;
a delay circuit delaying the transition detection signal by a predetermined time and outputting a delay detection signal; and
an output circuit outputting the first status information signal as the second status information signal in response to the delay detection signal.

16. The display apparatus of claim 15, wherein the receiving data comprise a receiving data signal and a main clock signal.

17. The display apparatus of claim 16, wherein the source driver further comprises:
a data recovery circuit recovering the receiving data signal among the receiving data;
a clock recovery circuit recovering the main clock signal among the receiving data; and
a data output circuit outputting the receiving data signal as data driving signals that are applied to the data lines in response to the main clock signal.

18. The display apparatus of claim 15, wherein the transition detection circuit comprises:
a first delay circuit receiving the first status information signal and outputting a first signal in synchronization with a clock signal;
a second delay circuit receiving the first signal from the first delay circuit and outputting a second signal in synchronization with the clock signal; and
a logic circuit receiving the first signal and the second signal and outputting the transition detection signal.

19. The display apparatus of claim 18, wherein the logic circuit outputs the transition detection signal having a first level when the first and second signals have different signal levels from each other.

20. The display apparatus of claim 15, wherein the output circuit comprises a flip-flop comprising an input terminal receiving the first status information signal, a clock input terminal receiving the delay detection signal, and an output terminal outputting the second status information signal.

* * * * *